US012697544B2

(12) United States Patent
Chigusa

(10) Patent No.: US 12,697,544 B2
(45) Date of Patent: Aug. 4, 2026

(54) STOP CONTROL DEVICE, STOP CONTROL METHOD, AND PROGRAM

(71) Applicant: Sony Interactive Entertainment Inc., Tokyo (JP)

(72) Inventor: Issei Chigusa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 173 days.

(21) Appl. No.: 18/559,567

(22) PCT Filed: May 10, 2022

(86) PCT No.: PCT/JP2022/019841
§ 371 (c)(1),
(2) Date: Nov. 8, 2023

(87) PCT Pub. No.: WO2022/244654
PCT Pub. Date: Nov. 24, 2022

(65) Prior Publication Data
US 2024/0374997 A1 Nov. 14, 2024

(30) Foreign Application Priority Data

May 17, 2021 (JP) ................................. 2021-083099

(51) Int. Cl.
*A63F 13/493* (2014.01)
*A63F 13/30* (2014.01)
(Continued)

(52) U.S. Cl.
CPC ............ *A63F 13/493* (2014.09); *A63F 13/30* (2014.09); *A63F 13/335* (2014.09);
(Continued)

(58) Field of Classification Search
CPC .... A63F 13/358; A63F 13/355; A63F 13/493; A63F 13/49; A63F 13/335; A63F 13/30;
(Continued)

(56) References Cited

U.S. PATENT DOCUMENTS 9,192,859 B2 * 11/2015 Perlman .............. H04N 19/188
9,782,676 B2 * 10/2017 Speck ..................... A63F 13/30
(Continued)

FOREIGN PATENT DOCUMENTS

CN 111744193 A 10/2020
JP 2003-325982 A 11/2003
(Continued)

OTHER PUBLICATIONS

International Search Report and Written Opinion mailed on Jul. 26, 2022, received for PCT Application PCT/JP2022/019841, filed on May 10, 2022, 10 pages including English Translation.
(Continued)

*Primary Examiner* — William H McCulloch, Jr.
(74) *Attorney, Agent, or Firm* — Kilpatrick Townsend & Stockton LLP

(57) ABSTRACT

Provided are a stop control device, a stop control method, and a program capable of reducing a disadvantage which is caused by temporal deterioration of a communication situation and suffered by a user. A server-side monitoring section monitors a communication situation between a cloud server that executes game processing in a streaming game and a terminal on which a moving image representing a play situation in the streaming game that is generated by execution of the game processing is displayed. A server-side game processing control section controls whether or not the game processing being executed by the cloud server is to be stopped, according to the communication situation.

17 Claims, 13 Drawing Sheets

(51) Int. Cl.

| | |
|---|---|
| *A63F 13/335* | (2014.01) |
| *A63F 13/355* | (2014.01) |
| *A63F 13/358* | (2014.01) |
| *A63F 13/48* | (2014.01) |
| *A63F 13/49* | (2014.01) |

(52) U.S. Cl.
CPC .......... *A63F 13/355* (2014.09); *A63F 13/358* (2014.09); *A63F 13/48* (2014.09); *A63F 13/49* (2014.09); *A63F 2300/407* (2013.01); *A63F 2300/534* (2013.01); *A63F 2300/535* (2013.01); *A63F 2300/538* (2013.01); *A63F 2300/554* (2013.01); *A63F 2300/636* (2013.01)

(58) Field of Classification Search
CPC ............... A63F 13/48; A63F 2300/407; A63F 2300/534; A63F 2300/535; A63F 2300/538; A63F 2300/636; A63F 2300/554
See application file for complete search history.

(56) References Cited

U.S. PATENT DOCUMENTS

| | | | | |
|---|---|---|---|---|
| 10,576,370 | B1 * | 3/2020 | Adamitskiy | .......... A63F 13/358 |
| 10,625,156 | B2 * | 4/2020 | Sherwani | ................ A63F 13/35 |
| 10,735,502 | B2 * | 8/2020 | Aoyagi | ................... G06F 9/445 |
| 11,516,284 | B2 * | 11/2022 | Aoyagi | ................... G06F 9/445 |
| 12,064,699 | B2 * | 8/2024 | Miura | ................... A63F 13/533 |
| 12,409,383 | B2 * | 9/2025 | Zhang | ..................... A63F 13/48 |
| 2010/0166065 | A1 * | 7/2010 | Perlman | ............... H04N 21/266 |
| | | | | 375/E7.173 |
| 2015/0141119 | A1 | 5/2015 | Lin | |
| 2016/0045826 | A1 * | 2/2016 | Speck | ................... A63F 13/493 |
| | | | | 463/31 |
| 2016/0220901 | A1 * | 8/2016 | Perlman | .................. A63F 13/30 |
| 2017/0085631 | A1 * | 3/2017 | Aoyagi | ................... G06F 9/445 |
| 2019/0321727 | A1 * | 10/2019 | Rodgers | ............... A63F 13/335 |
| 2021/0113930 | A1 * | 4/2021 | Miura | ................... A63F 13/355 |
| 2024/0374997 | A1 * | 11/2024 | Chigusa | ............... A63F 13/355 |

FOREIGN PATENT DOCUMENTS

| | | | |
|---|---|---|---|
| JP | 2004-015136 | A | 1/2004 |
| JP | 2008-035915 | A | 2/2008 |
| JP | 2010000258 | A | 1/2010 |
| JP | 2012254124 | A | 12/2012 |
| JP | 2013-090936 | A | 5/2013 |
| JP | 2014-184316 | A | 10/2014 |
| JP | 2019-005511 | A | 1/2019 |
| JP | 2021-000258 | A | 1/2021 |
| WO | 2015/145834 | A1 | 10/2015 |

OTHER PUBLICATIONS

"I Thought the Cloud Gaming Era Had Finally Come. but It Hasn't", PLUSIWORLD, Available Online at: https://web.archive.org/web/20210412213231/https://pluslworld.com/author-text, Feb. 10, 2021, 2 pages.

I Thought the Cloud Gaming Era Had Finally Come. but It Hasn't.) in particular. "The Storm Clouds of Cloud Gaming", PLUSIWORLD, Available Online at: https://web.archive.org/web/20210210092148/https://plusl world.com/cloud-gaming-shuts-down, Aug. 22, 2003, 12 pages.

Extended European Search Report of European Application No. 22804567.0 dated Apr. 7, 2025: pp. 1-10.

Office Action issued Jul. 30, 2024 in Japanese Patent Application No. 2023-522614 with English translation thereof.

* cited by examiner

F I G . 1
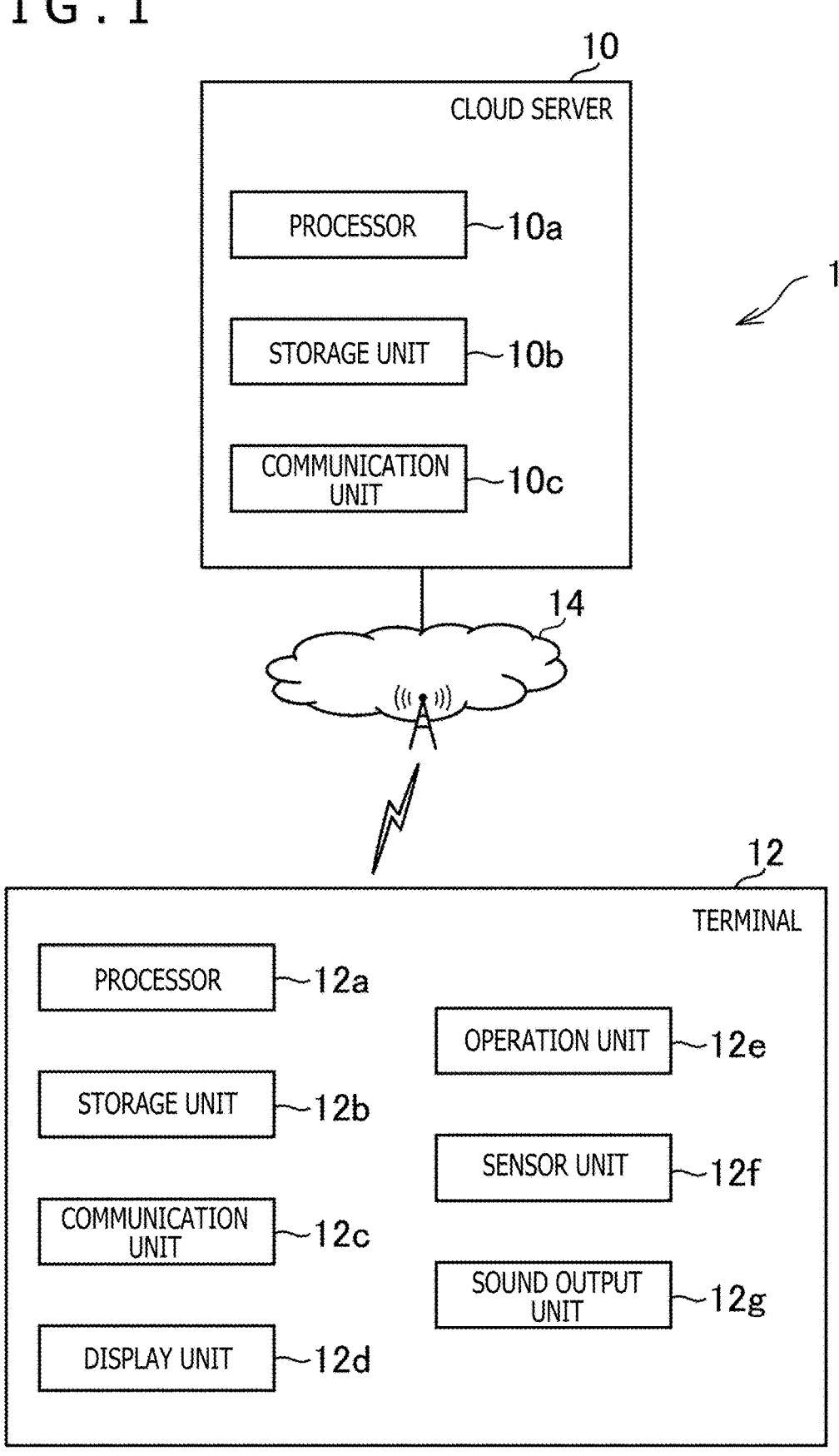

F I G . 3
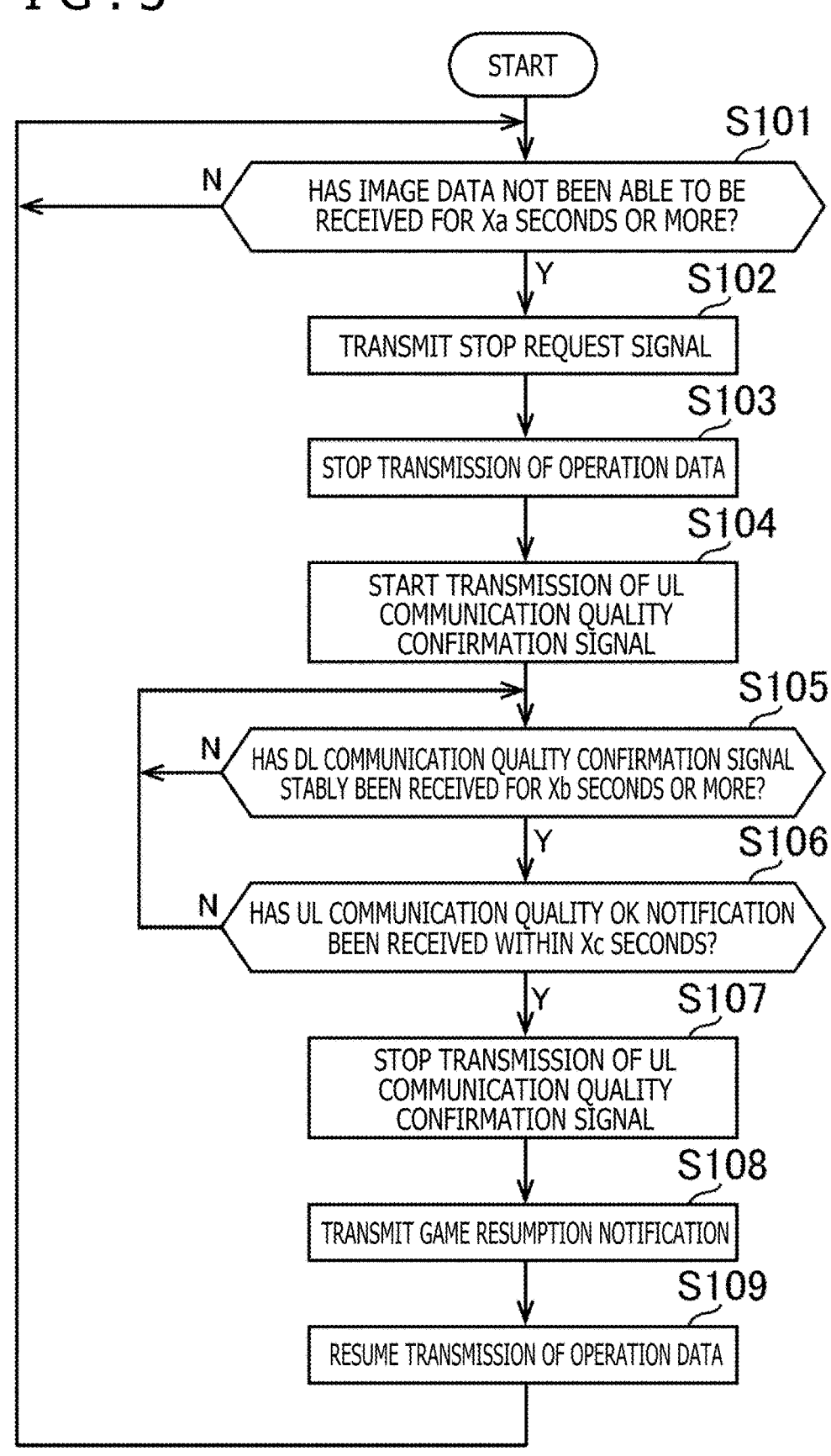

F I G . 6
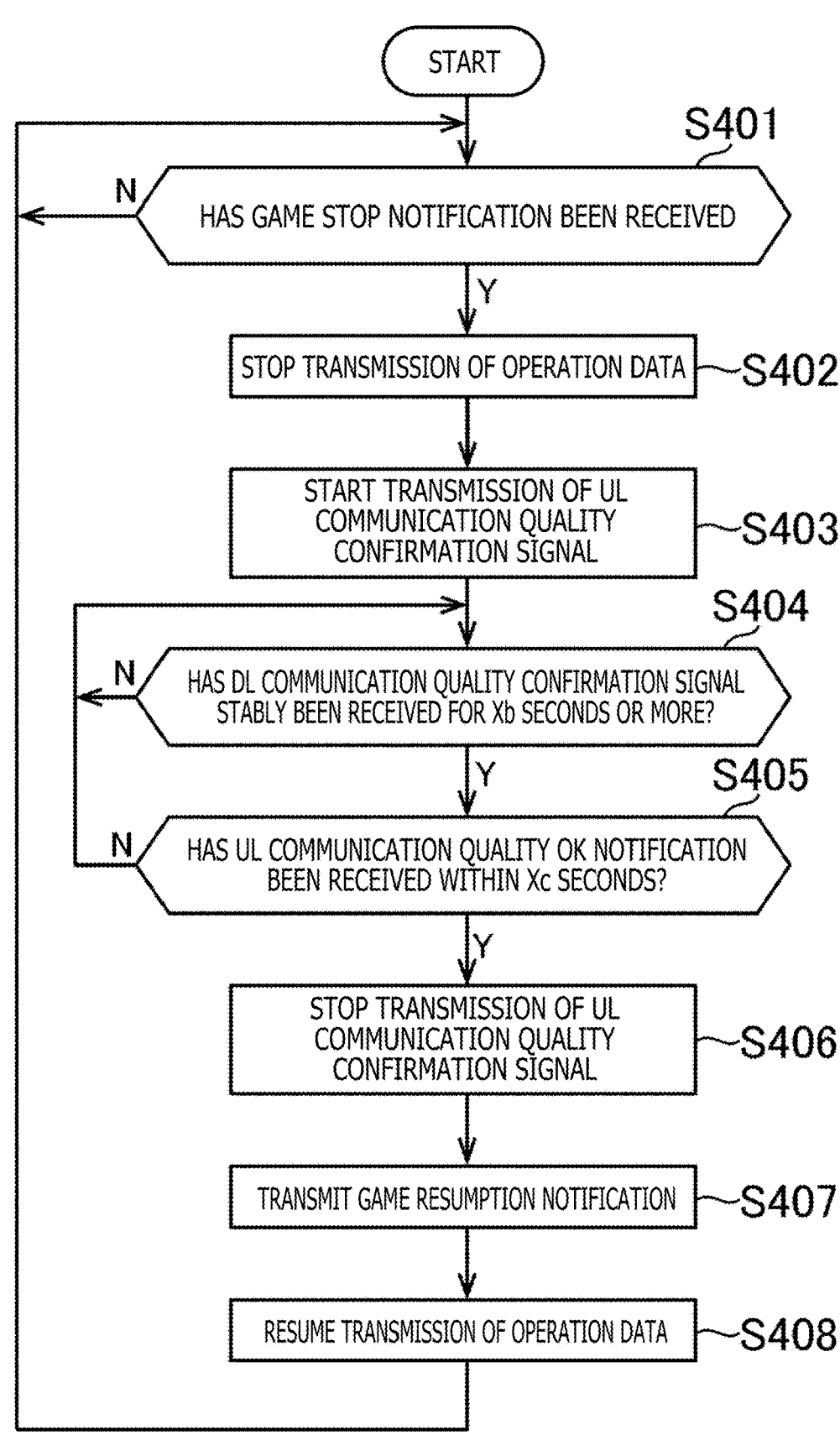

F I G . 8
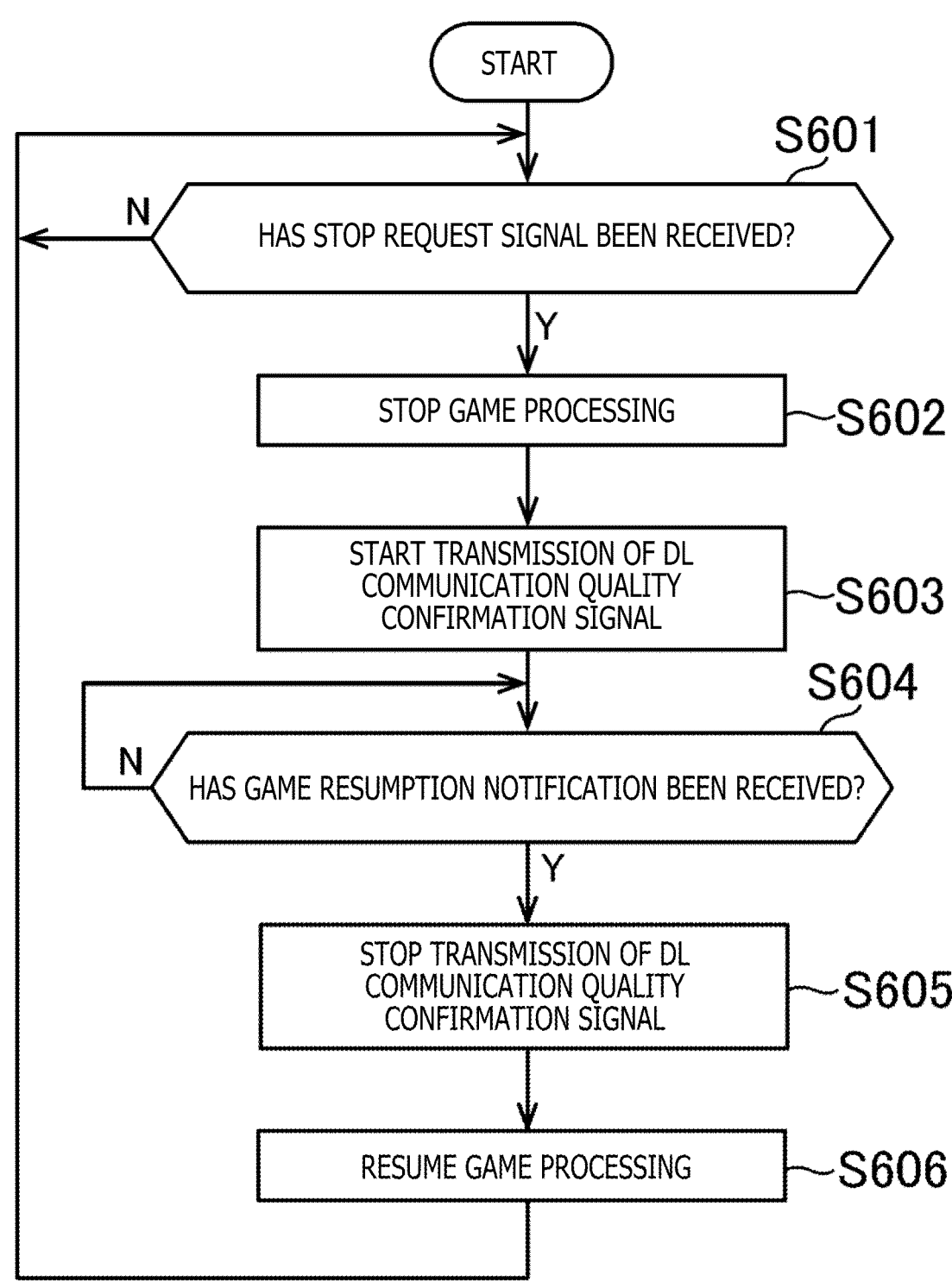

64

READY TO RESUME GAME.
DO YOU RESUME GAME?

66

RESUME

68

END GAME

70

WHERE DO YOU RESUME GAME?

RESUME FROM STOP POSITION    ~72a

RESUME FROM POSITION 5 SECONDS BEFORE STOP    ~72b

RESUME FROM POSITION 10 SECONDS BEFORE STOP    ~72c

STOP CONTROL DEVICE, STOP CONTROL METHOD, AND PROGRAM

CROSS-REFERENCE TO RELATED APPLICATIONS

The present application is based on PCT filing PCT/JP2022/019841, filed May 10, 2022, which claims priority from Japanese Patent Application No. 2021-083099, filed May 17, 2021, the entire contents of each are incorporated herein by reference.

TECHNICAL FIELD

The present invention relates to a stop control device, a stop control method, and a program.

BACKGROUND ART

In a technology for a cloud gaming service which has been attracting attention in recent years, operation data corresponding to an input operation made by a user on a terminal is wirelessly transmitted from the terminal to a cloud server. After that, the cloud server executes game processing corresponding to this operation data and generates a frame image representing a play situation of the game, on the basis of a result of the game processing. After that, image data obtained by encoding this frame image is wirelessly transmitted from the cloud server to the terminal, and the frame image obtained by decoding this image data is displayed on the terminal. As a result of repeated execution of this series of processing, a moving image representing the play situation of the game is displayed on the terminal.

SUMMARY

Technical Problem

When the communication situation deteriorates in a streaming service such as the cloud gaming service, such a problem that an input operation is not reflected in the play situation of the game or that the frame image displayed on the terminal is not updated may occur in the play of the game. This problem particularly likely occurs in a streaming game service provided through a mobile communication system such as a 4G (Fourth-Generation) mobile communication system or a 5G (Fifth-Generation) mobile communication system.

In some cases, the communication situation may subsequently recover. In this case, however, the game processing has progressed during the temporary deterioration of the communication situation, and hence, for example, the user playing the game suffers from such a disadvantage that the game has already been ended.

Note that this generally applies to a streaming game other than the cloud gaming service.

The present invention has been made in view of the actual situation described above and has one object of providing a stop control device, a stop control method, and a program which can reduce a disadvantage suffered by a user due to temporary deterioration of a communication situation.

Solution to Problem

In order to solve the problem described above, a stop control device according to the present invention includes a monitoring section configured to monitor a communication situation between a server that executes game processing in a streaming game and a terminal on which a moving image representing a play situation in the streaming game that is generated by execution of the game processing is displayed, and a game processing control section configured to control whether or not the game processing being executed by the server is to be stopped, according to the communication situation.

In one aspect of the present invention, the game processing control section causes the game processing to be stopped when a state in which the terminal fails in reception of image data relating to the moving image continues for a predetermined length of time.

Moreover, in one aspect of the present invention, the game processing control section causes the game processing to be stopped when a state in which the server fails in reception of operation data relating to the streaming game continues for a predetermined length of time.

Moreover, in one aspect of the present invention, when the game processing is stopped, the game processing control section causes the game processing being stopped to be resumed in response to recovery of the communication situation.

In the aspect, the game processing control section may cause the game processing to be resumed from a play situation specified by a user who plays the streaming game, according to an operation made on the terminal by the user.

Moreover, the game processing control section may perform control such that data representing a play situation from which the game processing is to be resumed is transmitted from the terminal to the server.

Moreover, a stop control method according to the present invention includes a step of monitoring a communication situation between a server that executes game processing in a streaming game and a terminal on which a moving image representing a play situation in the streaming game that is generated by execution of the game processing is displayed, and a step of controlling whether or not the game processing being executed by the server is to be stopped, according to the communication situation.

Moreover, a program according to the present invention causes a computer to execute a procedure of monitoring a communication situation between a server that executes game processing in a streaming game and a terminal on which a moving image representing a play situation in the streaming game that is generated by execution of the game processing is displayed, and a procedure of controlling whether or not the game processing being executed by the server is to be stopped, according to the communication situation.

BRIEF DESCRIPTION OF DRAWINGS

FIG. 1 is a diagram illustrating an example of an overall configuration of a cloud gaming system according to an embodiment of the present invention.

FIG. 3 is a flowchart illustrating an example of a flow of processing executed by a terminal according to the embodiment of the present invention.

FIG. 6 is a flowchart illustrating an example of a flow of processing executed by the terminal according to the embodiment of the present invention.

FIG. 8 is a flowchart illustrating an example of a flow of processing executed by the cloud server according to the embodiment of the present invention.

DESCRIPTION OF EMBODIMENT

Figure 2:
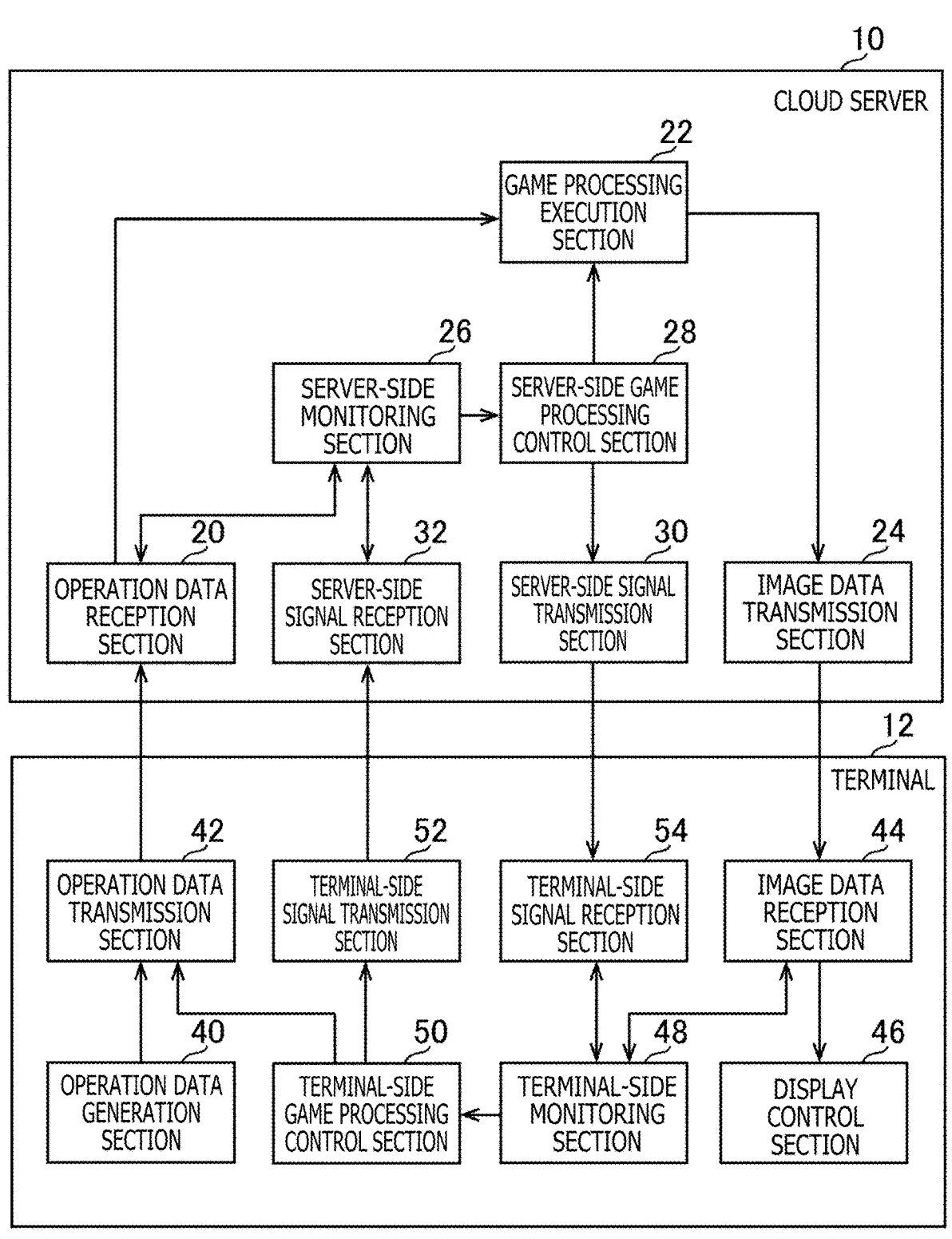
FIG. 2 is a functional block diagram illustrating an example of functions implemented in the cloud gaming system according to the embodiment of the present invention.

Now, an embodiment of the present invention will be described with reference to the drawings.

FIG. 1 is a diagram illustrating an example of an overall configuration of a cloud gaming system 1 according to the embodiment of the present invention. As illustrated in FIG. 1, the cloud gaming system 1 according to the present embodiment includes a cloud server 10 and a terminal 12 each of which mainly includes a computer.

The cloud server 10 and the terminal 12 are connected to a computer network 14 including a mobile communication system such as a 4G mobile communication system or a 5G mobile communication system, the Internet, and the like. For example, the cloud server 10 is connected to the Internet, and the terminal 12 is connected to the mobile communication system such as the 4G mobile communication system or the 5G mobile communication system. Further, the cloud server 10 and the terminal 12 can communicate with each other via the computer network 14.

The cloud server 10 according to the present embodiment is a server computer which, for example, executes a program for a streaming game, thereby executing game processing in the streaming game.

As illustrated in FIG. 1, the cloud server 10 includes, for example, a processor 10a, a storage unit 10b, and a communication unit 10c.

The processor 10a is a program control device, for example, a CPU (Central Processing Unit) or the like, and executes various types of information processing according to programs stored in the storage unit 10b.

The storage unit 10b is, for example, a storage device such as a ROM (Read-Only Memory) or a RAM (Random-Access Memory), and an SSD (Solid State Drive). The programs executed by the processor 10a and the like are stored in the storage unit 10b.

The communication unit 10c is a communication interface for transmitting and receiving data to and from a computer such as the terminal 12 via, for example, the computer network 14.

As illustrated in FIG. 1, the terminal 12 includes, for example, a processor 12a, a storage unit 12b, a communication unit 12c, a display unit 12d, an operation unit 12e, a sensor unit 12f, and a sound output unit 12g.

The processor 12a is a program control device, for example, a CPU or the like and executes various types of information processing according to programs stored in the storage unit 12b.

The storage unit 12b is, for example, a storage device such as a ROM or a RAM, and an SSD. The programs executed by the processor 12a and the like are stored in the storage unit 12b.

The communication unit 12c is a communication interface for transmitting and receiving data to and from a computer such as the cloud server 10 via, for example, the computer network 14.

The display unit 12d is a display device, for example, a liquid crystal display or an organic EL (Electroluminescent) display.

The operation unit 12e is an operation member used to execute, for example, operation input to the processor 12a.

The sensor unit 12f is a sensor such as a motion sensor capable of detecting, for example, an acceleration, an angular velocity, or the like.

The sound output unit 12g is a sound output device, for example, a speaker which outputs sound represented by sound data and the like.

Note that the terminal 12 may include a touch panel. In this case, this touch panel plays the role of both the display unit 12d and the operation unit 12e described above.

In the present embodiment, when a user executes, on the operation unit 12e, an input operation in the play of the streaming game, the terminal 12 generates operation data corresponding to this input operation and transmits this operation data to the cloud server 10.

After that, the cloud server 10 executes game processing in this game corresponding to the received operation data. After that, the cloud server 10 generates a play image which is a frame image representing a play situation of this game, on the basis of a result of this game processing. After that, the cloud server 10 generates image data representing this generated play image, by encoding the play image. After that, the cloud server 10 transmits the generated image data to the terminal 12.

After that, the terminal 12 decodes the image data received from the cloud server 10 and causes the display unit 12d to display the play image generated by this decoding. A moving image which is generated in this way by the execution of the game processing in the streaming game and which represents the play situation in this game is displayed on the terminal 12.

As described above, the cloud server 10 according to the present embodiment distributes, by streaming, the moving image generated according to the play situation of the game to the terminal 12 used by the user who is playing this game.

In the present embodiment, the reception of the image data described above is monitored on, for example, the terminal 12. Moreover, when a state in which the terminal 12 fails in the reception of the image data described above continues for a predetermined length of time (for example, Xa seconds), the terminal 12 transmits a stop request signal to the cloud server 10. The cloud server 10 then stops the game processing in response to the reception of the stop request signal.

Moreover, in the present embodiment, the reception of the operation data described above is monitored on, for example, the cloud server 10. Moreover, when a state in which the cloud server 10 fails in the reception of the operation data described above continues for a predetermined length of time (for example, Ya seconds), the cloud server 10 causes the game processing to stop and transmits a game stop notification to the terminal 12.

When the game processing is stopped as described above, a downlink communication quality confirmation signal (hereinafter referred to as a DL communication quality confirmation signal) is transmitted at a predetermined time interval from the cloud server 10 to the terminal 12. Moreover, an uplink communication quality confirmation signal (hereinafter referred to as a UL communication quality confirmation signal) is transmitted at a predetermined time interval from the terminal 12 to the cloud server 10.

Moreover, when it is confirmed that the UL communication quality confirmation signal has stably been received in the cloud server 10, the cloud server 10 transmits, to the terminal 12, an uplink communication quality OK notification (hereinafter referred to as a UL communication quality OK notification).

After that, when it is conformed that the DL communication quality confirmation signal has stably been received in the terminal 12 and when the terminal 12 receives the UL communication quality OK notification, the terminal 12 transmits a game resumption notification to the cloud server 10.

The cloud server 10 then resumes the game processing in response to the reception of the game resumption notification.

Note that, in the present embodiment, the game processing may be stopped or resumed by execution of a game program. For example, the game processing may be stopped or resumed by execution of pose processing or pose cancellation processing in the game program.

Moreover, the game processing may be stopped or resumed by execution of a system program such as an operating system. For example, the game processing may be stopped or resumed by execution of suspension processing or resumption processing in the system program.

When the communication situation deteriorates in the streaming game, such a problem that the input operation is not reflected in the play situation of the game or that the frame image displayed on the terminal 12 is not updated may occur in the play of the game. This problem particularly likely occurs in the streaming game service provided through the mobile communication system such as the 4G mobile communication system or the 5G mobile communication system.

In some cases, the communication situation may subsequently recover. In this case, however, the game processing has progressed during the temporary deterioration of the communication situation, and hence, for example, the user playing the game suffers from such a disadvantage that the game has already been ended.

In the present embodiment, whether or not to stop the game processing being executed by the cloud server 10 is controlled according to the communication situation as described above. With this configuration, according to the present embodiment, the disadvantage suffered by the user due to the temporary deterioration of the communication situation can be reduced.

Hereinafter, the functions implemented in the cloud gaming system 1 according to the present embodiment and the processing executed in the cloud gaming system 1 will further be described.

FIG. 2 is a functional block diagram illustrating an example of the functions implemented in the cloud gaming system 1 according to the present embodiment. Note that all of the functions illustrated in FIG. 2 do not necessarily need to be implemented in the cloud gaming system 1 according to the present embodiment and that functions other than the functions illustrated in FIG. 2 may be implemented.

As illustrated in FIG. 2, the cloud server 10 according to the present embodiment includes, in terms of function, for example, an operation data reception section 20, a game processing execution section 22, an image data transmission section 24, a server-side monitoring section 26, a server-side game processing control section 28, a server-side signal transmission section 30, and a server-side signal reception section 32.

The operation data reception section 20, the image data transmission section 24, the server-side signal transmission section 30, and the server-side signal reception section 32 are implemented mainly by the communication unit 10c. The game processing execution section 22, the server-side monitoring section 26, and the server-side game processing control section 28 are implemented mainly by the processor 10a.

The functions described above may be implemented by the processor 10a executing a program that is installed on the cloud server 10, which is the computer, and that includes instructions corresponding to the functions described above. This program may be supplied to the cloud server 10 via, for example, a computer-readable information storage medium such as an optical disc, a magnetic disk, a magnetic tape, a magneto-optic disk, and a flash memory or via the Internet or the like.

Moreover, as illustrated in FIG. 2, the terminal 12 according to the present embodiment includes, in terms of function, for example, an operation data generation section 40, an operation data transmission section 42, an image data reception section 44, a display control section 46, a terminal-side monitoring section 48, a terminal-side game processing control section 50, a terminal-side signal transmission section 52, and a terminal-side signal reception section 54.

The operation data generation section 40 is implemented mainly by the processor 12a and the operation unit 12e. The operation data transmission section 42, the image data reception section 44, the terminal-side signal transmission section 52, and the terminal-side signal reception section 54 are implemented mainly by the communication unit 12c. The display control section 46 and the terminal-side game processing control section 50 are implemented mainly by the processor 12a and the display unit 12d. The terminal-side monitoring section 48 is implemented mainly by the processor 12a.

The functions described above may be implemented by the processor 12a executing a program that is installed on the terminal 12, which is the computer, and that includes instructions corresponding to the functions described above. This program may be supplied to the terminal 12 via, for example, a computer-readable information storage medium such as an optical disc, a magnetic disk, a magnetic tape, a magneto-optic disk, and a flash memory or via the Internet or the like.

In the present embodiment, the operation data reception section 20 receives the operation data corresponding to, for example, the input operation made by the user. The operation data reception section 20 receives, for example, operation data corresponding to the input operation in the play of the streaming game and relating to this streaming game.

In the present embodiment, the game processing execution section 22 executes, for example, the game processing in the streaming game corresponding to the operation data received by the operation data reception section 20. The processing executed by the game processing execution section 22 includes, for example, processing of generating the play image representing the play situation of this streaming game and generating the image data representing this play image.

The image data transmission section 24 transmits, for example, the image data generated by the game processing execution section 22 to the terminal 12 in the present embodiment.

The server-side monitoring section 26 monitors, for example, the communication situation between the cloud server 10 and the terminal 12 in the present embodiment. The server-side monitoring section 26 monitors, for example, the reception of the operation data, the stop request signal, the UL communication quality confirmation signal, and the game resumption notification. Moreover, the server-side monitoring section 26 may monitor throughput of the cloud server 10.

In the present embodiment, the server-side game processing control section 28 controls, for example, whether or not to stop the game processing being executed by the cloud server 10, according to the communication situation monitored by the server-side monitoring section 26. For example, the server-side game processing control section 28 causes the game processing to be stopped when the state in which the terminal 12 fails in the reception of the image data continues for the predetermined length of time. Moreover, for example, the server-side game processing control section 28 causes the game processing to be stopped when the state in which the cloud server 10 fails in the reception of the operation data relating to the streaming game continues for the predetermined length of time.

Moreover, in the present embodiment, at the time when the game processing executed by the cloud server 10 is being stopped, the server-side game processing control section 28 resumes, in response to the recovery of the communication situation, the game processing being stopped, for example.

The server-side signal transmission section 30 transmits, for example, the game stop notification, the DL communication quality confirmation signal, the UL communication quality OK notification, and the game resumption notification to the terminal 12 in the present embodiment.

The server-side signal reception section 32 receives, for example, the stop request signal, the UL communication quality confirmation signal, and the game resumption notification from the terminal 12 in the present embodiment.

In the present embodiment, the operation data generation section 40 generates, for example, the above-mentioned operation data according to the input operation made by the user.

The operation data transmission section 42 transmits, for example, the operation data generated by the operation data generation section 40 to the cloud server 10 in the present embodiment.

In the present embodiment, the image data reception section 44 receives, for example, the image data relating to the moving image representing the play situation in the streaming game. The image data reception section 44 receives, for example, the image data transmitted from the cloud server 10.

The display control section 46 decodes, for example, the image data received by the image data reception section 44, to generate a play image which is a frame image represented by this image data, and causes the display unit 12$d$ to display the generated play image in the present embodiment.

The terminal-side monitoring section 48 monitors, for example, the communication situation between the cloud server 10 and the terminal 12 in the present embodiment. The terminal-side monitoring section 48 monitors, for example, the reception of the image data, the game stop notification, the DL communication quality confirmation signal, the UL communication quality OK notification, and the game resumption notification. Moreover, the terminal-side monitoring section 48 may monitor throughput of the terminal 12.

The terminal-side game processing control section 50 controls, for example, whether or not to stop the game processing being executed by the cloud server 10, according to the communication situation monitored by the terminal-side monitoring section 48, in the present embodiment. For example, the terminal-side game processing control section 50 causes the game processing to be stopped when the state in which the terminal 12 fails in the reception of the image data continues for the predetermined length of time. Moreover, for example, the terminal-side game processing control section 50 causes the game processing to be stopped when the state in which the cloud server 10 fails in the reception of the operation data relating to the streaming game continues for the predetermined length of time.

Moreover, in the present embodiment, at the time when the game processing executed by the cloud server 10 is being stopped, the terminal-side game processing control section 50 resumes, in response to the recovery of the communication situation, the game processing being stopped, for example.

The terminal-side signal transmission section 52 transmits, for example, the stop request signal, the UL communication quality confirmation signal, and the game resumption notification to the cloud server 10 in the present embodiment.

The terminal-side signal reception section 54 receives, for example, the game stop notification, the DL communication quality confirmation signal, the UL communication quality OK notification, and the game resumption notification from the cloud server 10 in the present embodiment.

Now, some processing examples executed by the cloud server 10 and the terminal 12 will be described. Note that, also in any one of the processing examples described now, it is assumed that the operation data is transmitted from the terminal 12 to the cloud server 10 at an interval of 4.16 milliseconds, and that the image data is transmitted from the cloud server 10 to the terminal 12 at an interval of 16.6 milliseconds.

With reference to a flowchart illustrated in FIG. 3, an example of a flow of processing which is executed by the terminal 12 and which is triggered by continuation of the state in which the terminal 12 fails in the reception of the image data for a predetermined length of time (for example, Xa seconds) will be described.

In the present processing example, the terminal-side monitoring section 48 is monitoring the reception of the image data by the image data reception section 44 (S101).

Moreover, when the state in which the image data reception section 44 has not been able to receive the image data for Xa seconds or more is detected by the terminal-side monitoring section 48, the terminal-side game processing control section 50 controls the terminal-side signal transmission section 52 to transmit the stop request signal to the cloud server 10. As a result of this control, the terminal-side signal transmission section 52 transmits the stop request signal to the cloud server 10 (S102).

After that, the terminal-side game processing control section 50 controls the operation data transmission section 42 to stop the transmission of the operation data. As a result of this control, the operation data transmission section 42 stops the transmission of the operation data (S103).

Note that, in the processing illustrated in S103, the terminal-side game processing control section 50 may control the operation data generation section 40 to stop the generation of the operation data. After that, as a result of this control, the operation data generation section 40 may stop the generation of the operation data.

After that, the terminal-side game processing control section 50 controls the terminal-side signal transmission section 52 to start the transmission of the UL communication quality confirmation signal. As a result of this control, the terminal-side signal transmission section 52 starts the transmission of the UL communication quality confirmation signal to the cloud server 10 at the predetermined time interval (S104). In this state, the UL communication quality confirmation signal may be transmitted, for example, at the same time interval (for example, the interval of 4.16 milliseconds) as the transmission interval of the operation data.

After that, the terminal-side monitoring section 48 monitors the reception of the DL communication quality confirmation signal by the terminal-side signal reception section 54 (S105).

In this state, it is assumed that the terminal-side monitoring section 48 determines that the terminal-side signal reception section 54 has stably received the DL communication quality confirmation signal transmitted from the cloud server 10, for a predetermined length of time (for example, Xb seconds) or more. In this case, the terminal-side monitoring section 48 monitors the reception of the UL communication quality OK notification by the terminal-side signal reception section 54 (S106).

In the processing illustrated in S106, for example, it may be determined that the DL communication quality confirmation signal has stably been received for the predetermined length of time or more, in the case in which the terminal-side signal reception section 54 has continuously received the DL communication quality confirmation signal for the predetermined length of time or more at an interval within a predetermined length of time. For example, it may be determined that the DL communication quality confirmation signal has stably been received for the predetermined length of time or more, in the case in which the reception of the DL communication quality confirmation signal at an interval within 33.2 milliseconds has continuously been successful for 100 milliseconds or more.

In the case in which it is not confirmed that the terminal-side signal reception section 54 has received the UL communication quality OK notification within a predetermined length of time (for example, Xc seconds) from a timing of the start of the processing illustrated in S106, the flow returns to the processing illustrated in S105.

It is assumed that it is confirmed that the terminal-side signal reception section 54 has received the UL communication quality OK notification within the predetermined length of time (for example, Xc seconds) from the timing of the start of the processing illustrated in S106. In this case, the terminal-side game processing control section 50 controls the terminal-side signal transmission section 52 to stop the transmission of the UL communication quality confirmation signal. As a result of this control, the terminal-side signal transmission section 52 stops the transmission of the UL communication quality confirmation signal (S107).

After that, the terminal-side game processing control section 50 controls the terminal-side signal transmission section 52 to transmit the game resumption notification. As a result of this control, the terminal-side signal transmission section 52 transmits the game resumption notification to the cloud server 10 (S108).

After that, the terminal-side game processing control section 50 controls the operation data transmission section 42 to resume the transmission of the operation data. As a result of this control, the operation data transmission section 42 resumes the transmission of the operation data (S109). After that, the flow returns to the processing illustrated in S101.

Note that, in the processing illustrated in S109, the terminal-side game processing control section 50 may control the operation data generation section 40 to resume the generation of the operation data. After that, as a result of this control, the operation data generation section 40 may resume the generation of the operation data.

Moreover, the processing illustrated in S103 and S109 may not be executed.

With reference to a flowchart illustrated in FIG. 4, an example of a flow of processing which is executed by the cloud server 10 and which is triggered by the reception of the stop request signal transmitted in the processing illustrated in S102 described before will next be described.

In the present processing example, the server-side monitoring section 26 is monitoring the reception of the stop request signal by the server-side signal reception section 32 (S201).

Moreover, when the reception of the stop request signal by the server-side signal reception section 32 is detected by the server-side monitoring section 26, the server-side game processing control section 28 causes the game processing execution section 22 to stop the game processing. As a result, the game processing execution section 22 stops the game processing (S202).

After that, the server-side game processing control section 28 controls the server-side signal transmission section 30 to start the transmission of the DL communication quality confirmation signal. As a result of this control, the server-side signal transmission section 30 starts the transmission of the DL communication quality confirmation signal to the terminal 12 at the predetermined time interval (S203). In this state, the DL communication quality confirmation signal may be transmitted, for example, at the same time interval (for example, the interval of 16.6 milliseconds) as the transmission interval of the image data.

After that, the server-side monitoring section 26 monitors the reception of the UL communication quality confirmation signal by the server-side signal reception section 32 (S204).

In this state, it is assumed that the server-side monitoring section 26 determines that the server-side signal reception section 32 has stably received the UL communication quality confirmation signal transmitted from the terminal 12, for a predetermined length of time (for example, Yb seconds) or more. In this case, the server-side game processing control section 28 controls the server-side signal transmission section 30 to transmit the UL communication quality OK signal. As a result of this control, the server-side signal transmission section 30 transmits the UL communication quality OK signal to the terminal 12 (S205).

In the processing illustrated in S205, for example, it may be determined that the UL communication quality confirmation signal has stably been received for the predetermined length of time or more, in the case in which the server-side signal reception section 32 has continuously received the UL communication quality confirmation signal for the predetermined length of time or more at an interval within a predetermined length of time. For example, it may be determined that the UL communication quality confirmation signal has stably been received for the predetermined length of time or more, in the case in which the reception of the DL communication quality confirmation signal at an interval within 33.2 milliseconds has continuously been successful for 100 milliseconds or more.

After that, the server-side monitoring section 26 monitors the reception of the game resumption notification by the server-side signal reception section 32 (S206).

Moreover, the server-side monitoring section 26 monitors whether or not a predetermined length of time (for example, Yc seconds) has elapsed from the start of the transmission of the UL communication quality OK signal (S207).

In the present processing example, while the reception of the game resumption notification is not confirmed, the processing illustrated in S205 is repeatedly executed until Yc seconds elapse from the start of the transmission of the UL communication quality OK signal.

When Yc seconds have elapsed from the start of the transmission of the UL communication quality OK signal while the reception of the game resumption notification is not confirmed, the flow returns to the processing illustrated in S204.

When the reception of the game resumption notification is confirmed in the processing illustrated in S206, the server-side game processing control section 28 controls the server-side signal transmission section 30 to stop the transmission of the DL communication quality confirmation signal. As a result of this control, the server-side signal transmission section 30 stops the transmission of the DL communication quality confirmation signal (S208).

After that, the server-side game processing control section 28 controls the game processing execution section 22 to resume the game processing. As a result of this control, the game processing execution section 22 resumes the game processing (S209). After that, the flow returns to the processing illustrated in S201.

In the processing example described above, the processing illustrated in S205 may not repeatedly be executed. For example, in the case in which the reception of the game resumption notification has not been confirmed within Yc seconds from the execution start of the processing illustrated in S206, the flow may be caused to return to the processing illustrated in S204.

With reference to a flowchart illustrated in FIG. 5, an example of a flow of processing which is executed by the cloud server 10 and which is triggered by continuation of the state in which the cloud server 10 fails in the reception of the above-mentioned operation data for a predetermined length of time (for example, Ya seconds) will next be described.

In the present processing example, the server-side monitoring section 26 is monitoring the reception of the operation data by the operation data reception section 20 (S301).

Moreover, when the state in which the operation data reception section 20 has not received the operation data for Ya seconds or more is detected by the server-side monitoring section 26, the server-side game processing control section 28 causes the game processing execution section 22 to stop the game processing. As a result of this control, the game processing execution section 22 stops the game processing (S302).

After that, the server-side game processing control section 28 controls the server-side signal transmission section 30 to transmit the game stop notification. As a result of this control, the server-side signal transmission section 30 transmits the game stop notification to the terminal 12 (S303).

Subsequently, the cloud server 10 executes processing similar to the processing illustrated in S203 to S209 described before (S304 to S310). The processing illustrated in S304 to S310 is similar to the processing illustrated in S203 to S209, and hence, a description thereof is omitted. When the processing illustrated in S310 is finished, the flow returns to the processing illustrated in S301.

With reference to a flowchart illustrated in FIG. 6, an example of a flow of processing which is executed by the terminal 12 and which is triggered by the reception of the game stop notification transmitted in the processing illustrated in S303 described above will next be described.

In the present processing example, the terminal-side monitoring section 48 is monitoring the reception of the game stop notification by the terminal-side signal reception section 54 (S401).

Moreover, when the reception of the game stop notification by the terminal-side signal reception section 54 is detected by the terminal-side monitoring section 48, the terminal-side game processing control section 50 controls the operation data transmission section 42 to stop the transmission of the operation data. As a result of this control, the operation data transmission section 42 stops the transmission of the operation data (S402).

Note that, in the processing illustrated in S402, the terminal-side game processing control section 50 may control the operation data generation section 40 to stop the generation of the operation data. After that, as a result of this control, the operation data generation section 40 may stop the generation of the operation data.

Subsequently, the cloud server 10 executes processing similar to the processing illustrated in S104 to S109 described before (S403 to S408). The processing illustrated in S403 to S408 is similar to the processing illustrated in S104 to S109, and hence, a description thereof is omitted. When the processing illustrated in S408 is finished, the flow returns to the processing illustrated in S401.

Note that the processing illustrated in S402 and S408 may not be executed.

Figure 4:
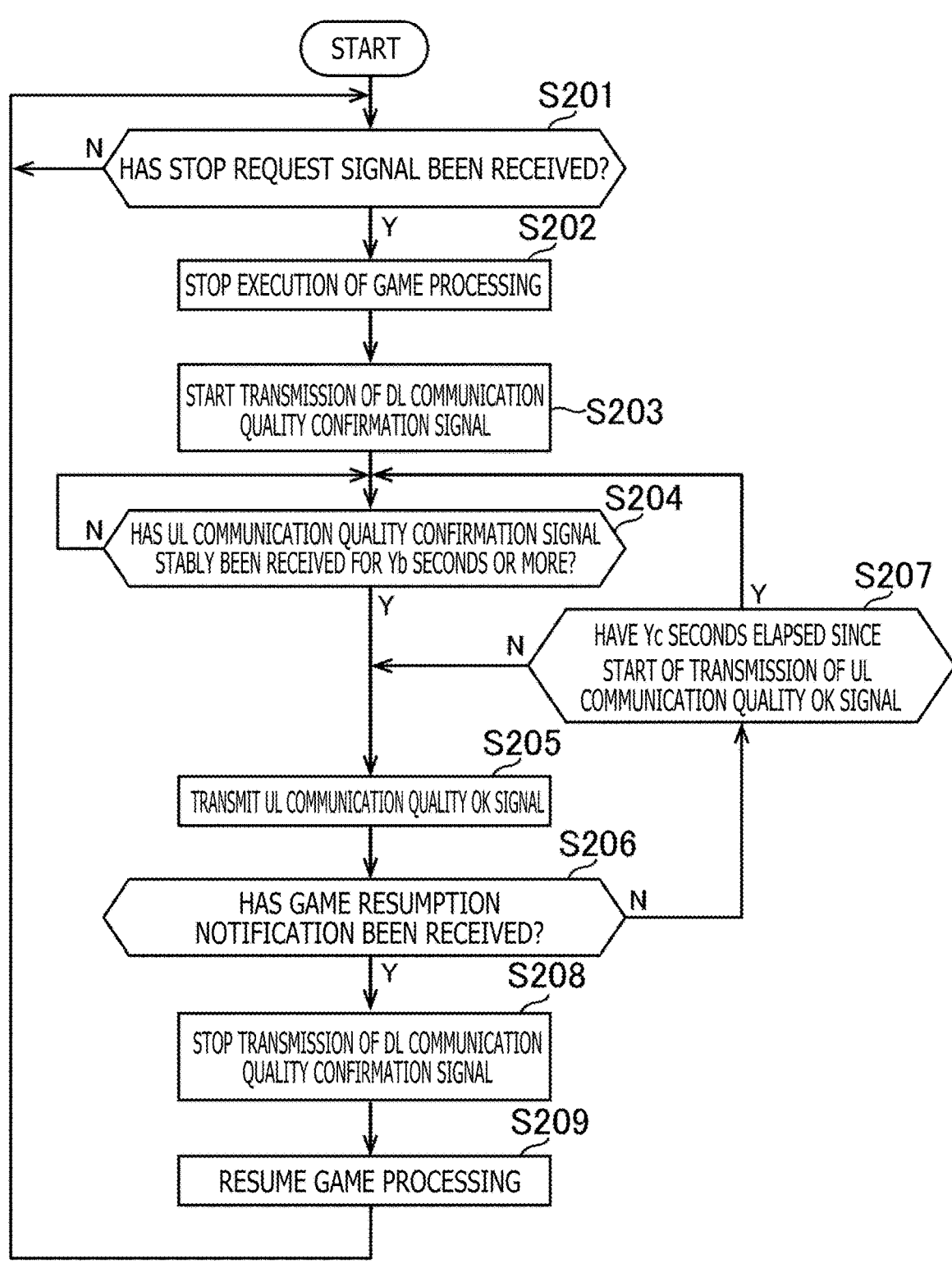
FIG. 4 is a flowchart illustrating an example of a flow of processing executed by a cloud server according to the embodiment of the present invention.
Figure 5:
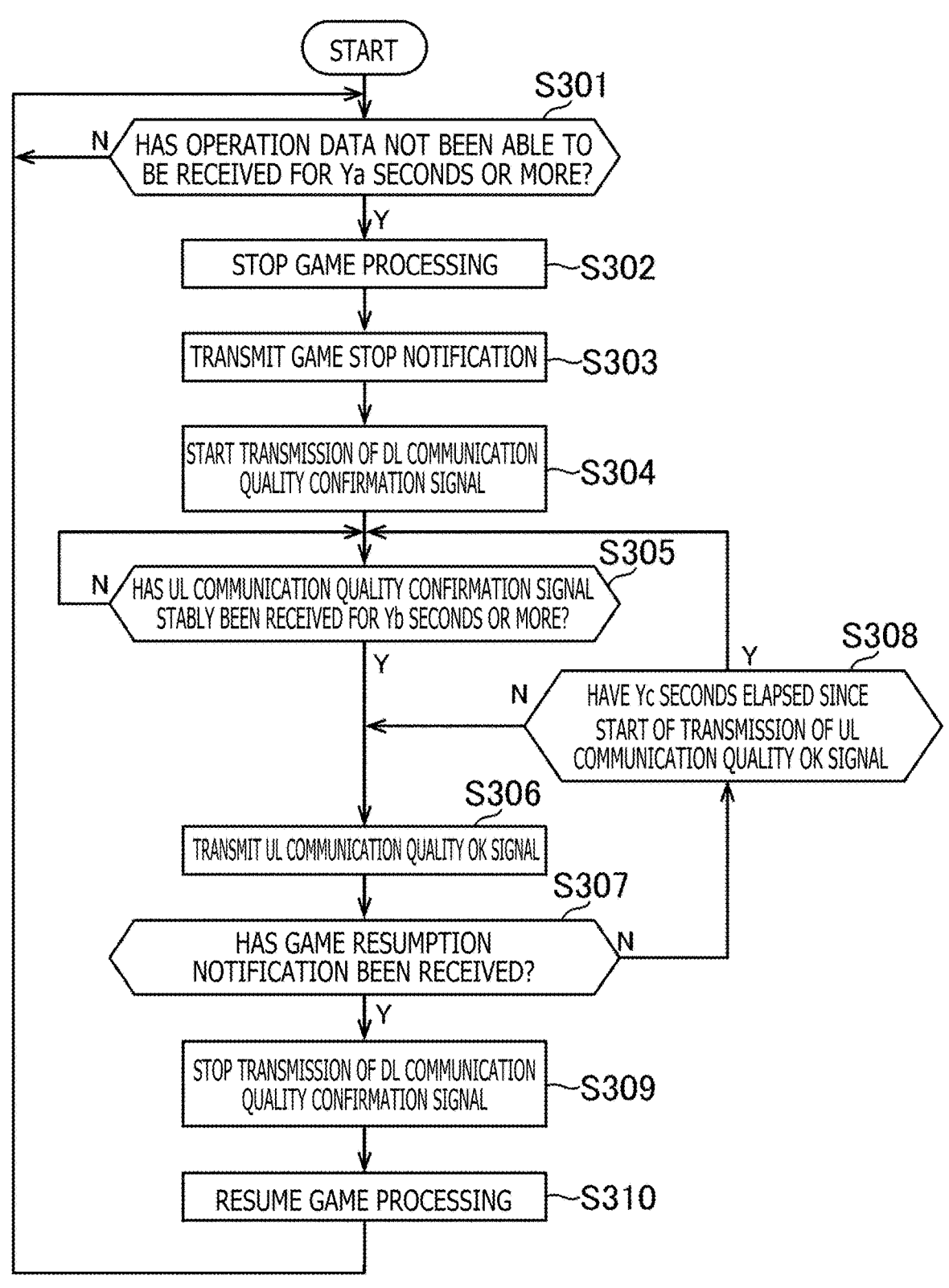
FIG. 5 is a flowchart illustrating an example of a flow of processing executed by the cloud server according to the embodiment of the present invention.

In the present embodiment, the processing triggered by the failure in the reception of the image data illustrated in FIG. 3 and FIG. 4 and the processing triggered by the failure in the reception of the operation data illustrated in FIG. 5 and FIG. 6 may be executed in a compatible manner, or one of them may be executed.

Figure 7:
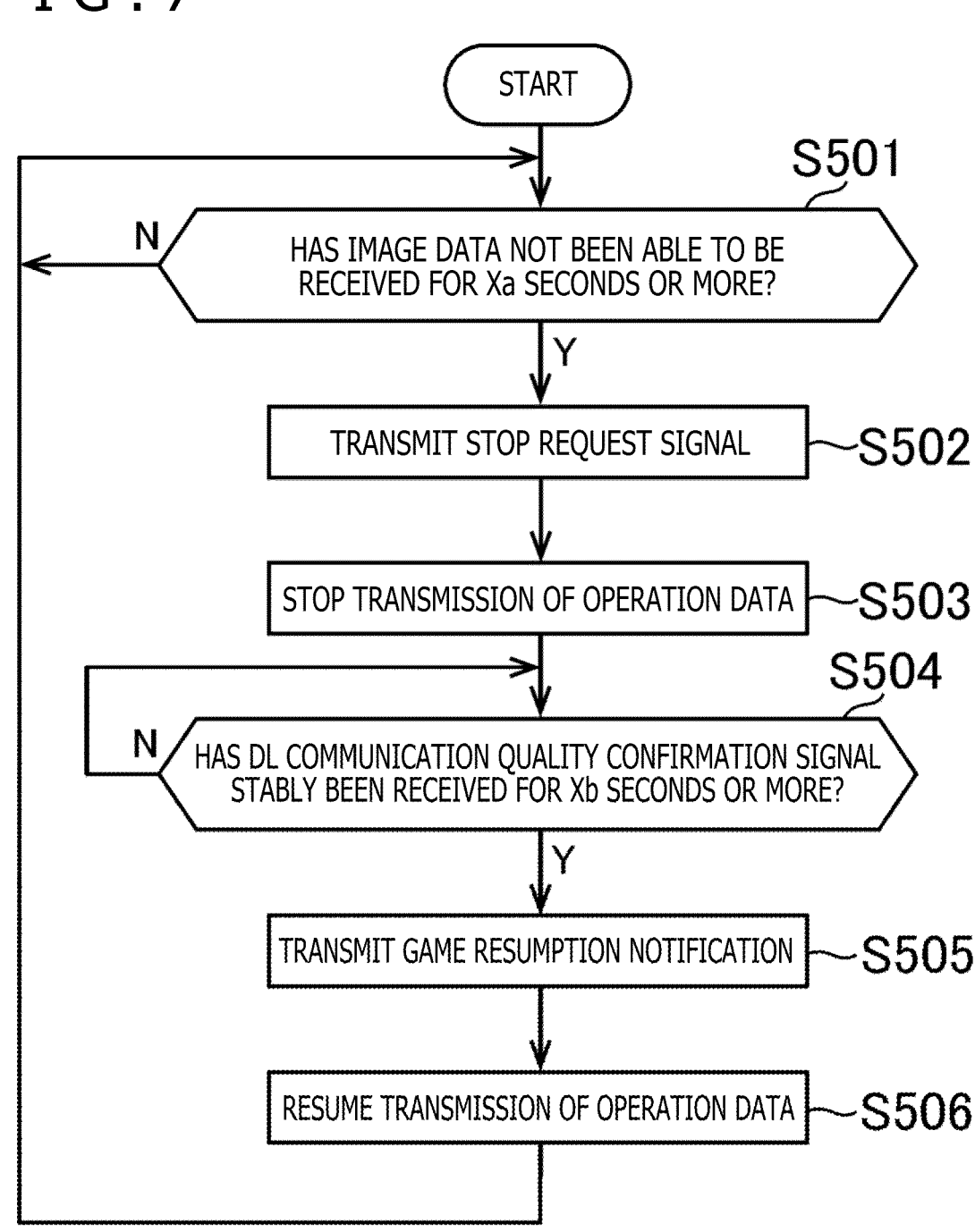
FIG. 7 is a flowchart illustrating an example of a flow of processing executed by the terminal according to the embodiment of the present invention.

Moreover, in the present embodiment, only the communication situation from the cloud server 10 to the terminal 12 may be considered. With reference to a flowchart illustrated in FIG. 7, an example of a flow of processing which is executed by the terminal 12 in this case and which is triggered by the continuation of the state in which the terminal 12 fails in the reception of the above-mentioned image data for the predetermined length of time (for example, Xa seconds) will be described.

Also in the present processing example, the terminal-side monitoring section 48 is monitoring the reception of the image data by the image data reception section 44 (S501).

Moreover, when the state in which the image data reception section 44 has not been able to receive the image data for Xa seconds or more is detected by the terminal-side monitoring section 48, the terminal-side game processing control section 50 controls the terminal-side signal transmission section 52 to transmit the stop request signal to the cloud server 10. As a result of this control, the terminal-side signal transmission section 52 transmits the stop request signal to the cloud server 10 (S502).

After that, the terminal-side game processing control section 50 controls the operation data transmission section 42 to stop the transmission of the operation data. As a result of this control, the operation data transmission section 42 stops the transmission of the operation data (S503).

Note that, in the processing illustrated in S503, the terminal-side game processing control section 50 may control the operation data generation section 40 to stop the generation of the operation data. After that, as a result of this control, the operation data generation section 40 may stop the generation of the operation data.

After that, the terminal-side monitoring section 48 monitors the reception of the DL communication quality confirmation signal by the terminal-side signal reception section 54 (S504).

In this state, it is assumed that the terminal-side monitoring section 48 determines that the terminal-side signal reception section 54 has stably received the DL communication quality confirmation signal transmitted from the cloud server 10, for the predetermined length of time (for example, Xb seconds) or more. In this case, the terminal-side game processing control section 50 controls the terminal-side signal transmission section 52 to transmit the game resumption notification. As a result of this control, the terminal-side signal transmission section 52 transmits the game resumption notification to the cloud server 10 (S505).

After that, the terminal-side game processing control section 50 controls the operation data transmission section 42 to resume the transmission of the operation data. As a result of this control, the operation data transmission section 42 resumes the transmission of the operation data (S506). After that, the flow returns to the processing illustrated in S501.

Note that, in the processing illustrated in S506, the terminal-side game processing control section 50 may control the operation data generation section 40 to resume the generation of the operation data. After that, as a result of this control, the operation data generation section 40 may resume the generation of the operation data.

With reference to a flowchart illustrated in FIG. 8, an example of a flow of processing which is executed by the cloud server 10 and which is triggered by the reception of the stop request signal transmitted in the processing illustrated in S502 described before will next be described.

Also in the present processing example, the server-side monitoring section 26 is monitoring the reception of the stop request signal by the server-side signal reception section 32 (S601).

Moreover, when the reception of the stop request signal by the server-side signal reception section 32 is detected by the server-side monitoring section 26, the server-side game processing control section 28 causes the game processing execution section 22 to stop the game processing. As a result, the game processing execution section 22 stops the game processing (S602).

After that, the server-side game processing control section 28 controls the server-side signal transmission section 30 to start the transmission of the DL communication quality confirmation signal. As a result of this control, the server-side signal transmission section 30 starts the transmission of the DL communication quality confirmation signal to the terminal 12 at the predetermined time interval (S603). In this state, the DL communication quality confirmation signal may be transmitted, for example, at the same time interval (for example, the interval of 16.6 milliseconds) as the transmission interval of the image data.

After that, the server-side monitoring section 26 monitors the reception of the game resumption notification by the server-side signal reception section 32 (S604).

When the reception of the game resumption notification is confirmed in the processing illustrated in S604, the server-side game processing control section 28 controls the server-side signal transmission section 30 to stop the transmission of the DL communication quality confirmation signal. As a result of this control, the server-side signal transmission section 30 stops the transmission of the DL communication quality confirmation signal (S605).

After that, the server-side game processing control section 28 controls the game processing execution section 22 to resume the game processing. As a result of this control, the game processing execution section 22 resumes the game processing (S606). After that, the flow returns to the processing illustrated in S601.

Figure 9:
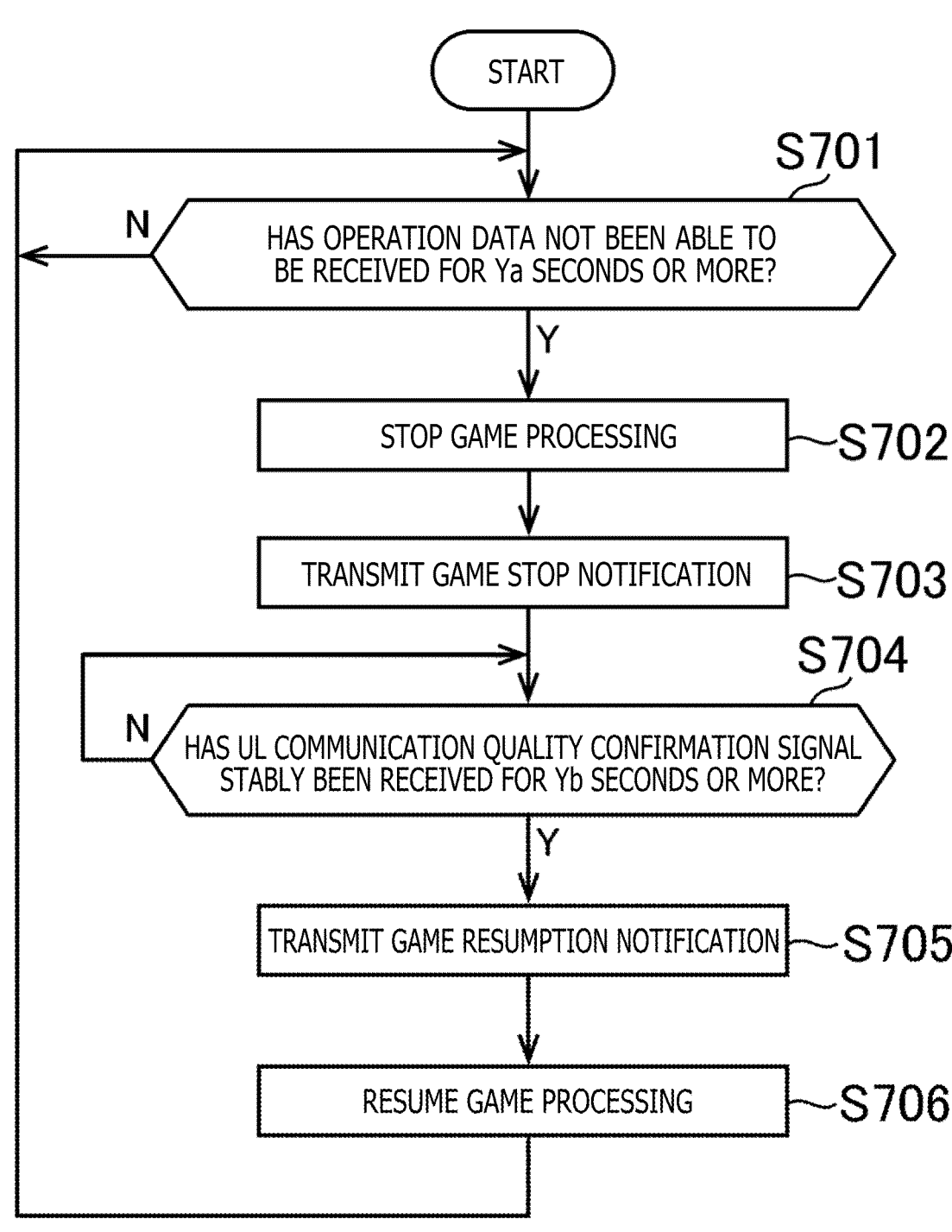
FIG. 9 is a flowchart illustrating an example of a flow of processing executed by the cloud server according to the embodiment of the present invention.

Moreover, in the present embodiment, only the communication situation from the terminal 12 to the cloud server 10 may be considered. With reference to a flowchart illustrated in FIG. 9, an example of a flow of processing which is executed by the cloud server 10 in this case and which is triggered by the continuation of the state in which the cloud server 10 fails in the reception of the above-mentioned operation data for the predetermined length of time (for example, Ya seconds) will be described.

Also in the present processing example, the server-side monitoring section 26 is monitoring the reception of the operation data by the operation data reception section 20 (S701).

Moreover, when the state in which the operation data reception section 20 has not received the operation data for Ya seconds or more is detected by the server-side monitoring section 26, the server-side game processing control section 28 causes the game processing execution section 22 to stop the game processing. As a result, the game processing execution section 22 stops the game processing (S702).

After that, the server-side game processing control section 28 controls the server-side signal transmission section 30 to transmit the game stop notification. As a result of this control, the server-side signal transmission section 30 transmits the game stop notification to the terminal 12 (S703).

After that, the server-side monitoring section 26 monitors the reception of the UL communication quality confirmation signal by the server-side signal reception section 32 (S704).

In this state, it is assumed that the server-side monitoring section 26 determines that the server-side signal reception section 32 has stably received the UL communication quality confirmation signal transmitted from the terminal 12, for the predetermined length of time (for example, Yb seconds) or more. In this case, the server-side game processing control section 28 controls the server-side signal transmission section 30 to transmit the game resumption notification. As a result of this control, the server-side signal transmission section 30 transmits the game resumption notification to the terminal 12 (S705).

After that, the server-side game processing control section 28 controls the game processing execution section 22 to resume the game processing. As a result of this control, the game processing execution section 22 resumes the game processing (S706). After that, the flow returns to the processing illustrated in S701.

Figure 10:
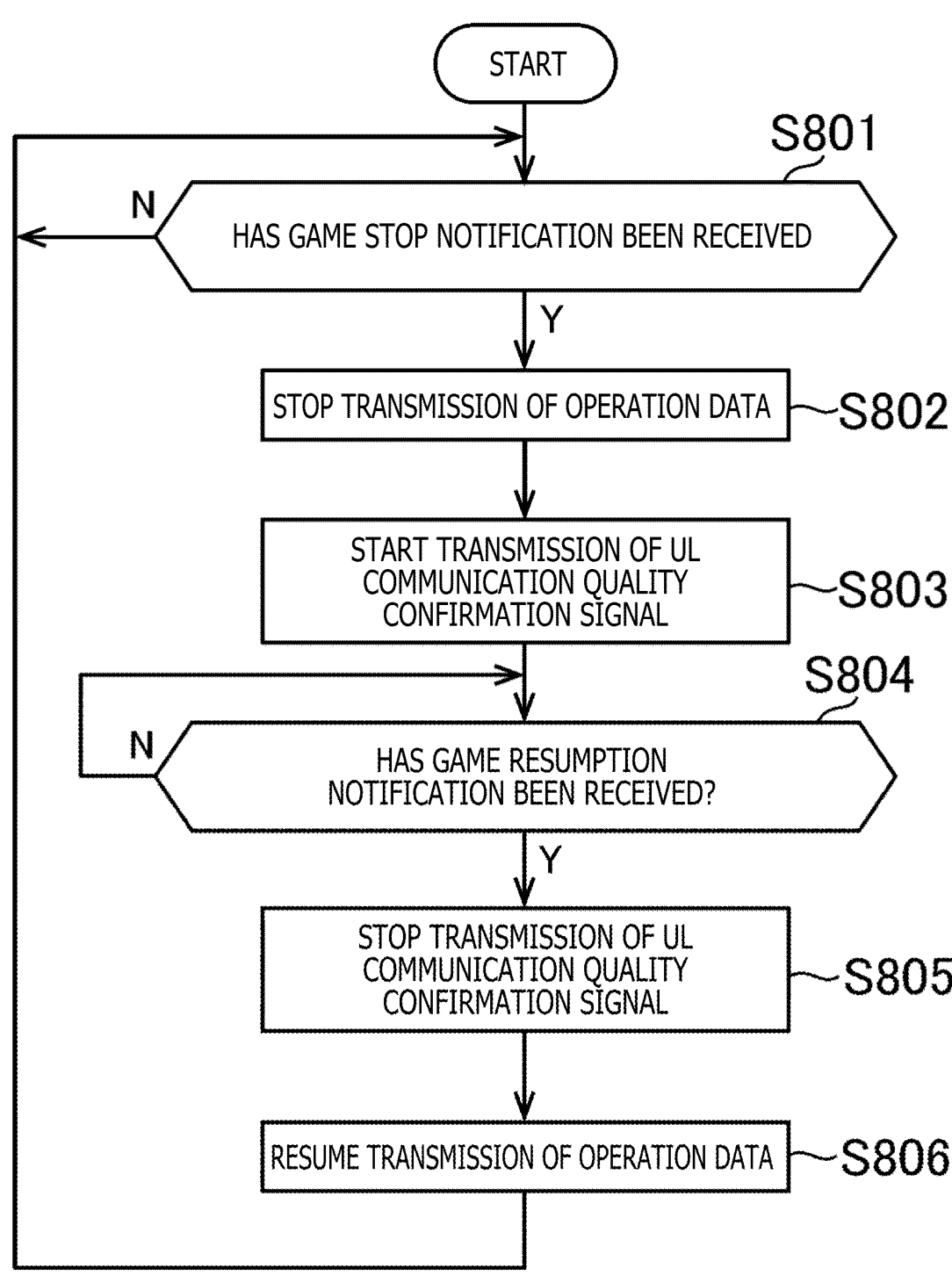
FIG. 10 is a flowchart illustrating an example of a flow of processing executed by the terminal according to the embodiment of the present invention.

With reference to a flowchart illustrated in FIG. 10, an example of a flow of processing which is executed by the terminal 12 and which is triggered by the reception of the game stop notification transmitted in the processing illustrated in S703 described above will next be described.

Also in the present processing example, the terminal-side monitoring section 48 is monitoring the reception of the game stop notification by the terminal-side signal reception section 54 (S801).

After that, when the reception of the game stop notification by the terminal-side signal reception section 54 is detected by the terminal-side monitoring section 48, the terminal-side game processing control section 50 controls the operation data transmission section 42 to stop the transmission of the operation data. As a result of this control, the operation data transmission section 42 stops the transmission of the operation data (S802).

Note that, in the processing illustrated in S802, the terminal-side game processing control section 50 may control the operation data generation section 40 to stop the generation of the operation data. After that, as a result of this control, the operation data generation section 40 may stop the generation of the operation data.

After that, the terminal-side game processing control section 50 controls the terminal-side signal transmission section 52 to start the transmission of the UL communication quality confirmation signal. As a result of this control, the terminal-side signal transmission section 52 starts the transmission of the UL communication quality confirmation signal to the cloud server 10 at the predetermined time interval (S803). In this state, the UL communication quality confirmation signal may be transmitted, for example, at the same time interval (for example, the interval of 4.16 milliseconds) as the transmission interval of the operation data.

After that, the terminal-side monitoring section 48 monitors the reception of the game resumption notification by the terminal-side signal reception section 54 (S804).

When the reception of the game resumption notification is confirmed in the processing illustrated in S804, the terminal-side game processing control section 50 controls the terminal-side signal transmission section 52 to stop the transmission of the UL communication quality confirmation signal. As a result of this control, the terminal-side signal transmission section 52 stops the transmission of the UL communication quality confirmation signal (S805).

After that, the terminal-side game processing control section 50 controls the operation data transmission section 42 to resume the transmission of the operation data. As a result of this control, the operation data transmission section 42 resumes the transmission of the operation data (S806). After that, the flow returns to the processing illustrated in S801.

Note that, in the processing illustrated in S806, the terminal-side game processing control section 50 may control the operation data generation section 40 to resume the generation of the operation data. After that, as a result of this control, the operation data generation section 40 may resume the generation of the operation data.

In the processing illustrated in S105 and the processing illustrated in S504 in the processing examples described above, the terminal-side monitoring section 48 may monitor the throughput of the terminal 12. Moreover, in the processing illustrated in S106 and the processing illustrated in S505, it may be determined that the DL communication quality confirmation signal has stably been received for the predetermined length of time or more, in the case in which throughput of the terminal 12 is continuously equal to or more than a predetermined threshold value for the predetermined length of time or more. For example, it may be determined that the DL communication quality confirmation signal has stably been received for the predetermined length of time or more, in the case in which the throughput is equal to or more than 5 Mbps for 100 milliseconds or more.

Moreover, in the processing illustrated in S204 and the processing illustrated in S704 in the processing examples described above, the server-side monitoring section 26 may monitor the throughput of the cloud server 10. After that, in the processing illustrated in S205 and the processing illustrated in S705, it may be determined that the UL communication quality confirmation signal has stably been received for the predetermined length of time or more, in the case in which the throughput of the cloud server 10 is continuously equal to or more than a predetermined threshold value for the predetermined length of time or more. For example, it may be determined that the UL communication quality confirmation signal has stably been received for the predetermined length of time or more, in the case in which the throughput is equal to or more than 1 Mbps for 100 milliseconds or more.

In this state, in consideration of the fact that the data size of operation data is smaller than the data size of the image data, a value smaller than a threshold value for the throughput in the determination relating to the DL communication quality confirmation signal is set as a threshold value for the throughput in the determination relating to the UL communication quality confirmation signal.

Figure 11:
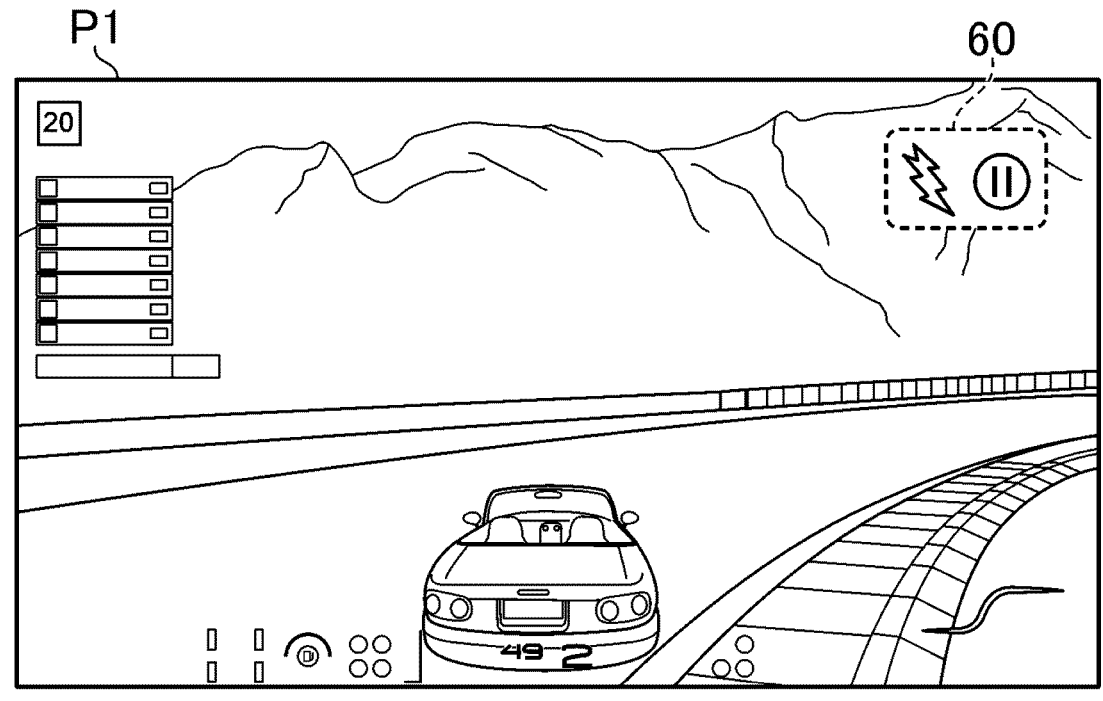
FIG. 11 is a view illustrating an example of a stop-state image.

Moreover, in the present embodiment, the terminal-side game processing control section 50 may cause the display unit 12*d* to display a stop-state image 60 representing the stop of the game processing as illustrated in FIG. 11, in response to the stop of the game processing. For example, the terminal-side game processing control section 50 may cause the display unit 12*d* to display the stop-state image 60 as illustrated in FIG. 11 when the terminal 12 transmits the stop request signal. As another example, the terminal-side game processing control section 50 may cause the display unit 12*d* to display the stop-state image 60 as illustrated in FIG. 11 when the terminal 12 receives the game stop notification. In this case, the stop-state image 60 may be superimposed on a play image P1 being displayed. Note that a string representing the stop state may be displayed on the display unit 12*d*.

Figure 12:
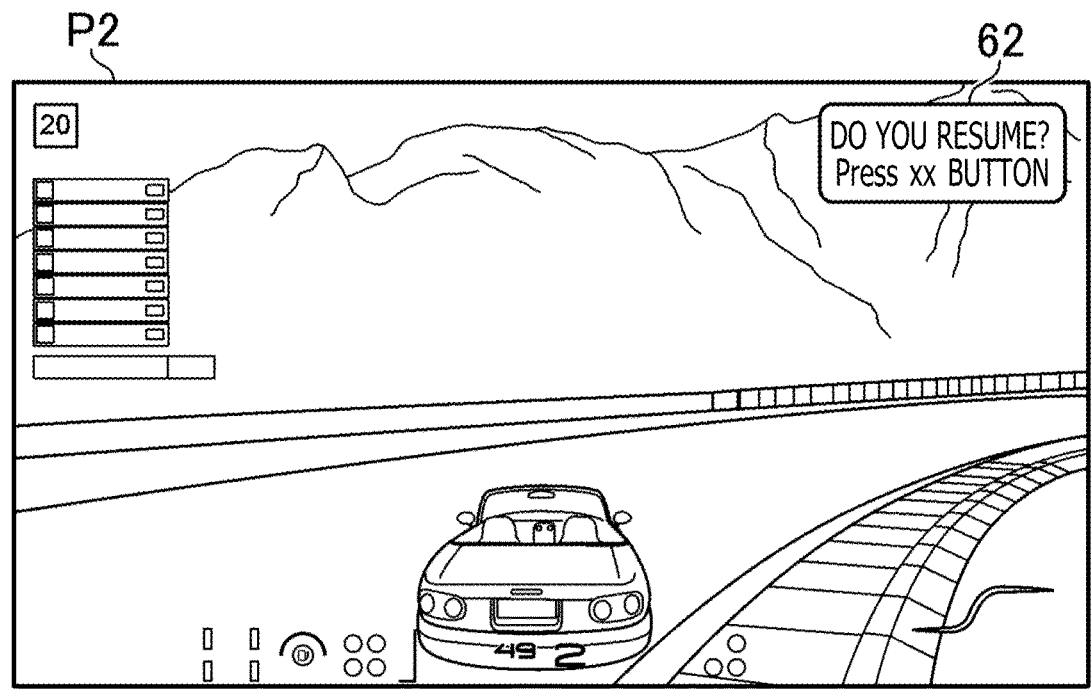
FIG. 12 is a view illustrating an example of a resumption image.
Figure 13:
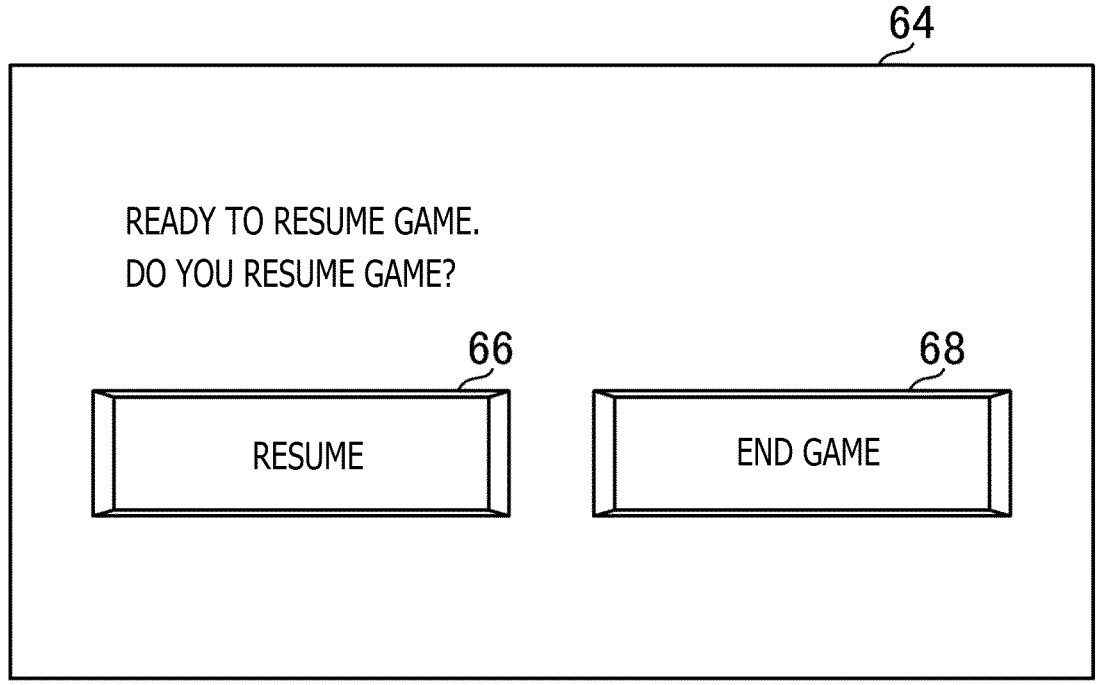
FIG. 13 is a view illustrating an example of the resumption image.
Figure 15:
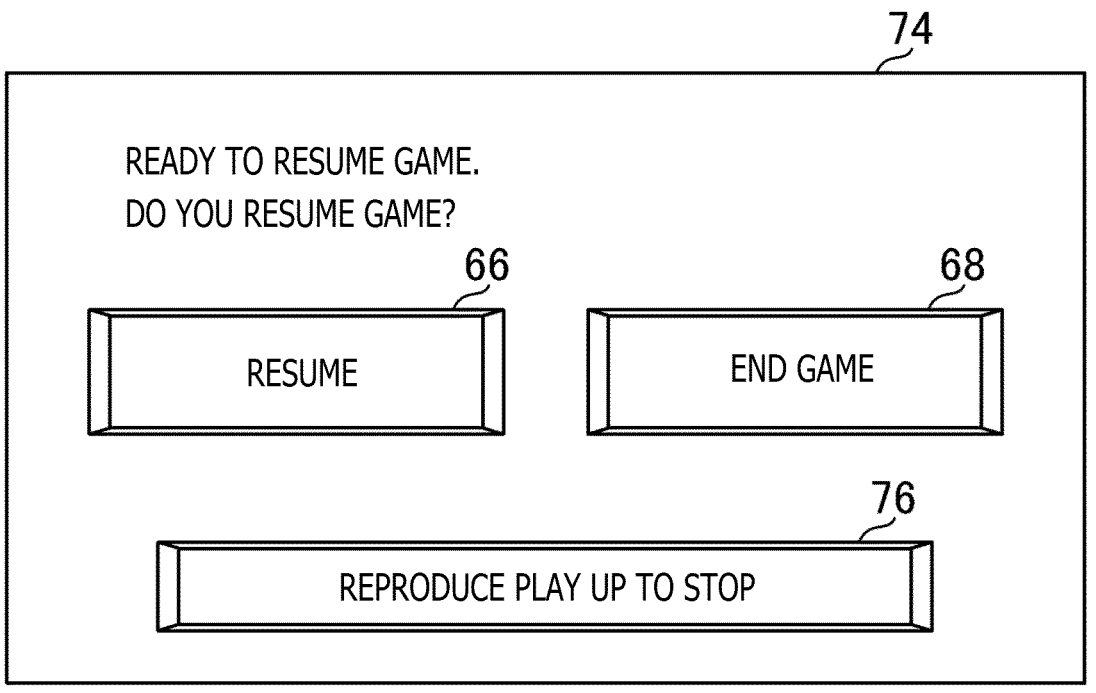
FIG. 15 is a view illustrating an example of the resumption image.

Moreover, for example, before the game resumption notification is transmitted in the processing illustrated in S108, S408, and S505, the terminal-side game processing control section 50 may cause the display unit 12*d* to display resumption images as illustrated in FIG. 12, FIG. 13, and FIG. 15.

FIG. 12 is a view illustrating an example of a resumption image 62. As illustrated in FIG. 12, the resumption image 62 may be superimposed on a play image P2 being displayed.

Moreover, according to a predetermined operation (for example, an operation of pressing a button not used for the play of the game) made by the user, the terminal-side game processing control section 50 may control the terminal-side signal transmission section 52 to transmit the game resumption notification. After that, the terminal-side signal transmission section 52 may transmit the game resumption notification to the cloud server 10.

FIG. 13 is a view illustrating another example of a resumption image 64. Similarly to the resumption image 62, the resumption image 64 may also be superimposed on the play image being displayed. On the resumption image 64 illustrated in FIG. 13, a resumption button 66 and an end button 68 are arranged.

In this state, in the case in which a selection operation made on the resumption button 66 by the user is received, the terminal-side game processing control section 50 may control the terminal-side signal transmission section 52 to transmit the game resumption notification, and the terminal-side signal transmission section 52 may transmit the game resumption notification to the cloud server 10.

On the other hand, in the case in which a selection operation made on the end button 68 by the user is received, the terminal-side game processing control section 50 may control the terminal-side signal transmission section 52 to transmit a game finish notification, and the terminal-side signal transmission section 52 may transmit the game finish notification to the cloud server 10. After that, the server-side signal reception section 32 may receive this game finish notification, and the server-side game processing control section 28 may instruct the game processing execution section 22 to finish the game processing being executed. After that, the game processing execution section 22 may finish the game processing being executed.

Figure 14:
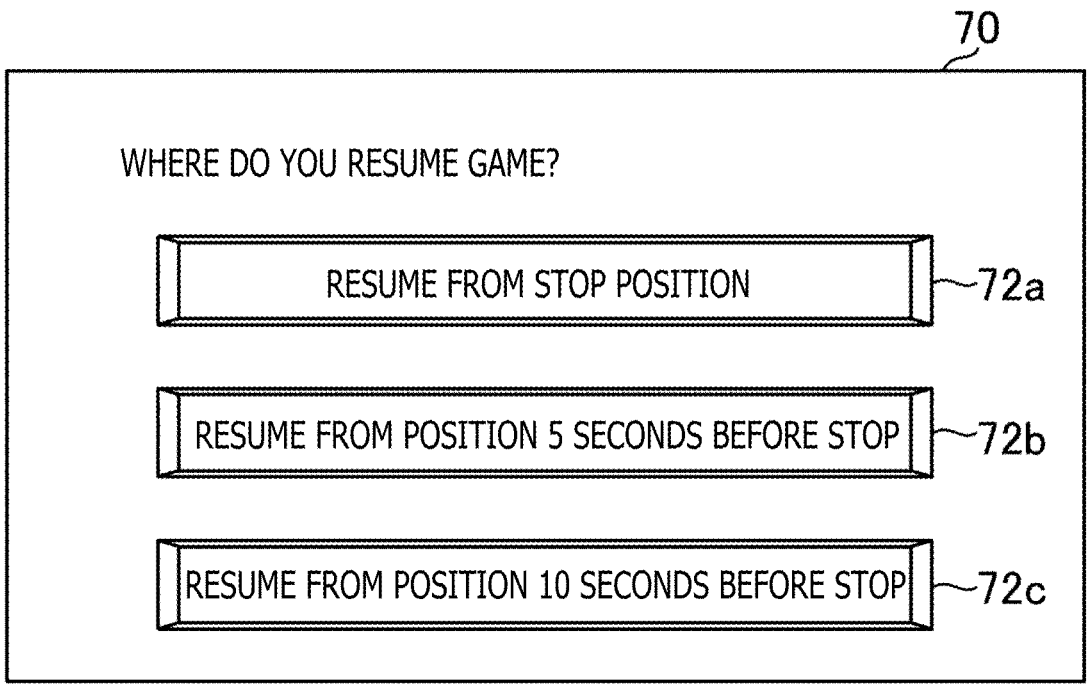
FIG. 14 is a view illustrating an example of a resumption instruction image.

Moreover, in the case in which the selection operation made on the resumption button 66 by the user is received, the terminal-side game processing control section 50 may cause the display unit 12d to display a resumption instruction image 70 as illustrated in FIG. 14. In this case, the resumption instruction image 70 may be superimposed on the play image being displayed. On the resumption instruction image 70, a plurality of instruction buttons 72 (72a, 72b, and 72c) each corresponding to a different play situation are arranged.

After that, for example, in response to reception of a selection operation made on the instruction button 72 by the user, the terminal-side game processing control section 50 may generate a game resumption notification which is associated with play situation data representing a play situation associated with the selected instruction button 72. After that, the terminal-side game processing control section 50 may control the terminal-side signal transmission section 52 to transmit the generated game resumption notification, and the terminal-side signal transmission section 52 may transmit the game resumption notification to the cloud server 10.

After that, the server-side game processing control section 28 may control the game processing execution section 22 to resume the game processing from the play situation represented by the play situation data associated with this game resumption notification. After that, the game processing execution section 22 may resume the game processing from this play situation.

The play situation data described above may be data representing, for example, a length of time (such as zero seconds, five seconds, and ten seconds) by which the game is to be rolled back from the timing of the stop of the game processing when the game processing is to be resumed. Moreover, the play situation data described before may be, for example, data indicating a frame number of the play image representing the play situation from which the game processing is to be resumed.

For example, when the instruction button 72a is selected, the game processing may be resumed from a play situation at the time when the game processing was stopped. Moreover, when the instruction button 72b is selected, the game processing may be resumed from a play situation five seconds before the time when the game processing was stopped. Moreover, when the instruction button 72c is selected, the game processing may be resumed from a play situation ten seconds before the time when the game processing was stopped. Note that such resumption of the game processing may be implemented by using a technology described in, for example, JP 2014-184316A.

For example, as described above, the terminal-side game processing control section 50 may perform control such that the data representing the play situation from which the game processing is to be resumed is transmitted from the terminal 12 to the cloud server 10. In this state, the terminal-side game processing control section 50 may perform control such that the data representing the play situation specified by the user who plays the streaming game is transmitted from the terminal 12 to the cloud server 10.

Moreover, the server-side game processing control section 28 may cause the game processing to be resumed from the play situation specified by the user who plays the steaming game, according to an operation made on the terminal 12 by this user. Moreover, the terminal-side game processing control section 50 may cause the game processing to be resumed from the play situation specified by the user who plays the steaming game, according to an operation made on the terminal 12 by this user. With these configurations, the user can resume the game processing from a desired play situation.

FIG. 15 is a view illustrating another example of a resumption image 74. On the resumption image 74 illustrated in FIG. 15, the resumption button 66, the end button 68, and a reproduction button 76 are arranged.

In this state, in the case in which the selection operation made on the reproduction button 76 is received, the terminal-side game processing control section 50 may cause the display unit 12d to display the moving image representing the play situation at a predetermined length of time before the stop of the play.

For example, the moving image representing the play situation of the streaming game being played may be stored in the terminal 12. Moreover, in response to the reception of the selection operation made on the reproduction button 76, the moving image stored in the terminal 12 may be reproduced.

Moreover, the moving image representing the play situation of the streaming game being played may be stored in the cloud server 10. Moreover, according to the selection operation made on the reproduction button 76, the terminal 12 may transmit a reproduction instruction for this moving image to the cloud server 10. After that, the cloud server 10 may transmit the moving image stored in the cloud server 10 to the terminal 12 in response to the reception of this reproduction instruction. After that, the terminal 12 may cause the display unit 12d to display the moving image received from the cloud server 10. Moreover, there may be provided such a configuration that any frame image (play image) included in this moving image can be displayed on the display unit 12d by operating a seek bar or the like. After that, according to a specification operation made by the user, a game resumption notification associated with play situation data indicating a frame number of the play image being displayed at the time of the specification operation may be transmitted from the terminal 12 to the cloud server 10. With this configuration, the user can seek for the play situation from which the user intends to resume the game processing.

Note that, in the case in which the selection operation is made on the resumption button 66 illustrated in FIG. 15, processing similar to that in the case in which the selection operation is made on the resumption button 66 illustrated in FIG. 13 may be executed. Note that, in the case in which the selection operation is made on the end button 68 illustrated in FIG. 15, processing similar to that in the case in which the selection operation is made on the end button 68 illustrated in FIG. 13 may be executed.

Note that the stop-state image 60, the resumption image 62, the resumption image 64, the resumption instruction image 70, and the resumption image 74 may be images generated by the terminal-side game processing control section 50 or images stored in advance in the terminal 12. Moreover, the stop-state image 60, the resumption image 62, the resumption image 64, the resumption instruction image 70, and the resumption image 74 may be images stored in advance in the cloud server 10. Moreover, the stop-state image 60, the resumption image 62, the resumption image 64, the resumption instruction image 70, and the resumption image 74 may be images generated by the server-side game processing control section 28 and may be transmitted by the server-side signal transmission section 30 to the terminal 12.

Moreover, for example, in the case in which a length of time in which the game processing has been stopped is longer than a predetermined length of time in the processing illustrated in S108, S408, and S505, the terminal-side game processing control section 50 may cause the display unit 12*d* to display, before the transmission of the game resumption notification, the resumption image described before. On the other hand, in the case in which the length of time in which the game processing has been stopped is equal to or shorter than the predetermined length of time, the game resumption notification may immediately be transmitted without the display of the resumption image described before. With this configuration, in the case in which the game processing has stopped for a length of time longer than the predetermined length of time, the user can select whether or not to resume the game processing, and otherwise, the resumption of the game processing is smoothly executed without intervention of the user.

Moreover, in the processing illustrated in S109, S408, S506, and S806, the data representing the play situation from which the game processing to be resumed may be associated with the operation data transmitted for the first time after the resumption of the transmission of the operation data. For example, the frame number of the play image representing the play situation from which the game processing is to be resumed may be associated with this operation data.

Note that the present invention is not limited to the embodiment described above.

Moreover, an application range of the present invention is not limited to the cloud gaming system 1.

Moreover, the application range of the present invention is not limited to the computer network 14 including the mobile communication system such as the 4G mobile communication system or the 5G mobile communication system. The present invention can be applied to not only the wireless communication via the mobile communication system such as the 4G mobile communication system or the 5G mobile communication system, but also the computer network 14 in which the wireless communication through the Wi-Fi (registered trademark) is executed.

Moreover, the specific strings and numerical values described above and the specific strings and numerical values in the drawings are examples, and the present invention is not limited to these strings and numerical values.

The invention claimed is:

1. A terminal device comprising:
   a communication interface configured to transmit and receive data to and from a server via a computer network; and one or more processors configured to:
      receive an image representing a play situation in a streaming game from the server at the communication interface;
      control a display device to display the image;
      monitor a communication status between the server and the terminal device;
      control the server to stop executing game processing, upon detecting failure in the communication between the server and the terminal device for a predetermined length of time;
      control, when the game processing is stopped, the terminal device to stop transmission of operation data relating to the streaming game to the server, and to transmit a communication quality confirmation signal from at least one of the server and the terminal device to another one of the server and the terminal device.

2. The terminal device according to claim 1, wherein the one or more processors are configured to:
   monitor reception of image data relating to the image from the server; and
   control the server to stop the game processing upon detecting failure in reception of image data relating to the image for a predetermined length of time.

3. The terminal device of claim 2, wherein the one or more processors are configured to monitor a throughput indicative of the reception of image data relating to the image from the server.

4. The terminal device according to claim 1, wherein the one or more processors are configured to:
   monitor transmission of the operation data to the server; and
   control the server to stop the game processing upon detecting failure in transmission of the operation data relating to the streaming game for a predetermined length of time.

5. The terminal device according to claim 1, wherein the one or more processors are configured to control the server to resume the game processing from a play situation, according to an operation made on the terminal device.

6. The terminal device according to claim 5, wherein the one or more processors are configured to transmit data representing a play situation from which the game processing is to be resumed to the server.

7. The terminal device of claim 1, wherein, upon confirmation of recovery of communication with the server based on the communication quality confirmation signal, the one or more processors are configured to:
   control the server to resume the game processing; and
   resume the transmission of the operation data to the server.

8. A method comprising:
   receiving an image representing a play situation in a streaming game from a server;
   controlling a display device to display the image;
   monitoring a communication status between the server and a terminal device;
   controlling the server to stop executing game processing by the server, upon detecting failure in the communication between the server and the terminal device for a predetermined length of time; and
   controlling, when the game processing is stopped, the terminal device to stop transmission of operation data relating to the streaming game to the server and to transmit a communication quality confirmation signal from at least one of the server and a terminal device to another one of the server and the terminal device.

9. The method of claim 8, further comprising:

upon confirmation of recovery of communication with the server based on the communication quality confirmation signal:

controlling the server to resume the game processing; and resuming the transmission of the operation data to the server.

10. The method of claim 8, wherein the communication status between the server and the terminal device comprises transmission of the operation data to the server.

11. The method of claim 8, wherein the communication status between the server and the terminal device comprises reception of image data relating to the image from the server.

12. The method of claim 11, wherein monitoring the communication status comprises monitoring a throughput indicative of the reception of image data relating to the image from the server.

13. A non-transitory, computer readable storage medium containing a program which, when executed by a processor, causes the processor to perform a method by carrying out actions, comprising:

receiving an image representing a play situation in a streaming game from a server;

controlling a display device to display the image;

monitoring a communication status between the server and a terminal device;

controlling the server to stop executing game processing, upon detecting failure in the communication between the server and the terminal device for a predetermined length of time; and controlling, when the game processing is stopped, the terminal device to stop transmission of operation data relating to the streaming game from the terminal device to the server and to transmit a communication quality confirmation signal from at least one of the server and the terminal to another one of the server and the terminal device.

14. The non-transitory, computer readable storage medium of claim 13, wherein, upon confirmation of recovery of communication with the server based on the communication quality confirmation signal, the program further causes the processor to perform the method by carrying out further actions comprising:

controlling the server to resume the game processing; and resuming the transmission of the operation data to the server.

15. The non-transitory, computer readable storage medium of claim 13, wherein the communication status between the server and the terminal device comprises transmission of the operation data to the server.

16. The non-transitory, computer readable storage medium of claim 13, wherein the communication status between the server and the terminal device comprises reception of image data relating to the image from the server.

17. The non-transitory, computer readable storage medium of claim 16, wherein monitoring the communication status comprises monitoring a throughput indicative of the reception of image data relating to the image from the server.

* * * * *